United States Patent
Gerraty

(10) Patent No.: US 10,579,361 B1
(45) Date of Patent: Mar. 3, 2020

(54) SYSTEMS AND METHODS FOR EFFICIENTLY UPDATING SOFTWARE INSTALLED ON NETWORK DEVICES

(71) Applicant: Juniper Networks, Inc., Sunnyvale, CA (US)

(72) Inventor: Simon J. Gerraty, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 75 days.

(21) Appl. No.: 15/378,774

(22) Filed: Dec. 14, 2016

(51) Int. Cl.
*G06F 8/65* (2018.01)
*G06F 8/61* (2018.01)
*H04L 29/08* (2006.01)

(52) U.S. Cl.
CPC ............... *G06F 8/65* (2013.01); *G06F 8/61* (2013.01); *H04L 67/34* (2013.01)

(58) Field of Classification Search
CPC ............. G06F 8/65; G06F 8/61; H04L 67/34
USPC ......................................................... 717/169
See application file for complete search history.

(56) References Cited

U.S. PATENT DOCUMENTS

| | | | | |
|---|---|---|---|---|
| 6,167,567 A | * | 12/2000 | Chiles ........................ | G06F 8/65 709/221 |
| 6,622,302 B1 | | 9/2003 | Delaney et al. | |
| 2002/0188937 A1 | * | 12/2002 | Webster .................... | G06F 8/65 717/171 |
| 2004/0031029 A1 | * | 2/2004 | Lee ........................... | G06F 8/65 717/171 |
| 2008/0098094 A1 | * | 4/2008 | Finkelstein ........... | G06F 9/4411 709/220 |
| 2011/0035740 A1 | | 2/2011 | Powell et al. | |

(Continued)

FOREIGN PATENT DOCUMENTS

WO WO 2013017925 A1 2/2013

OTHER PUBLICATIONS

Itani et al, "PETRA: A Secure and Energy-Efficient Software Update Protocol for Severely-Constrained Network Devices", [Online], 2009, pp. 37-43, [Retrieved from Internet on Oct. 23, 2019], <http://delivery.acm.org/10.1145/1650000/1641952/p37-itani.pdf?ip=151.207.250.22&id=1641952&acc=ACTIVE%20SERVI> (Year: 2009).*

(Continued)

*Primary Examiner* — S. Sough
*Assistant Examiner* — Zengpu Wei
(74) *Attorney, Agent, or Firm* — FisherBroyles, LLP

(57) ABSTRACT

The disclosed computer-implemented method may include (1) obtaining an update initiation file that facilitates updating an operating system installed on a network device by way of one or more packages that (A) are external to the update initiation file and (B) have yet to be downloaded to the network device, (2) identifying certain device-specific details about the network device that influence which packages are necessary to achieve the update, (3) determining, based at least in part on the update initiation file and the certain device-specific details, the packages that are necessary to achieve the update, (4) downloading the necessary packages by way of one or more links included in the update initiation file, and then (5) updating the operating system by installing the necessary packages downloaded by way of the links included in the update initiation file. Various other methods, systems, and computer-readable media are also disclosed.

16 Claims, 6 Drawing Sheets

(56) References Cited

U.S. PATENT DOCUMENTS

| | | | |
|---|---|---|---|
| 2015/0040155 A1 | 2/2015 | Gutta et al. | |
| 2016/0057258 A1* | 2/2016 | Jogadhenu | H04L 67/34 370/394 |
| 2018/0052676 A1* | 2/2018 | Charters | G06F 8/65 |

OTHER PUBLICATIONS

Subramanian et al. "Dynamic Software Updates: A VM-centric Approach", [Online], 2009, pp. 1-11, [Retrieved from Internet on Oct. 23, 2019], <https://suriya.github.io/papers/jvolve-pldi.pdf> (Year: 2009).*

Simon J. Gerraty; Systems and Methods for Efficiently Downgrading Operating Systems Installed on Network Devices; U.S. Appl. No. 15/395,868, filed Dec. 30, 2016.

* cited by examiner

```
                          Update Initiation File
                                   120
--------------------------------------------------------------------------------
************************************************

Hardware Platform: MX5 Router

Software Architectures: OS 9.1R1.1  →  http://os-update.com/mx5_91r11
                                OS 9.1R1.2  →  http://os-update.com/mx5_91r12

OS 9.1R2.1  →  http://os-update.com/mx5_91r21
                                OS 9.1R2.2  →  http://os-update.com/mx5_91r22

OS 9.2R1.1  →  http://os-update.com/mx5_92r11
                                OS 9.2R1.2  →  http://os-update.com/mx5_92r12

Hardware Platform: ACX500 Router

Software Architectures: OS 9.1R1.1     http://os-update.com/acx500_91r11
                                OS 9.1R1.2     http://os-update.com/acx500_91r12

OS 9.1R2.1     http://os-update.com/acx500_91r21
                                OS 9.1R2.2     http://os-update.com/acx500_91r22

OS 9.2R1.1     http://os-update.com/acx500_92r11
                                OS 9.2R1.2     http://os-update.com/acx500_92r12

Resource
500

---
**********************************************

URL: http://os-update.com/acx500_91r21

Packages: Packages 220(3), 220(6), 220(7), 220(12), 220(13), 220(30), 220(32)

SYSTEMS AND METHODS FOR EFFICIENTLY UPDATING SOFTWARE INSTALLED ON NETWORK DEVICES

BACKGROUND

Operating systems are often updated to fix certain software bugs and/or improve the performance of network devices. For example, an operating system running on a router may receive an update that is intended to patch a newly discovered security vulnerability and improve the router's performance. In this example, the update may arrive as a software bundle that includes various packages. While some of these packages may be relevant to and/or necessary for the router to achieve the desired update, others may be irrelevant to and/or unnecessary for the router to achieve the desired update.

For example, the software bundle may be designed to enable different router models running different operating system versions to achieve the desired update. Accordingly, one router model with one version of the operating system may need to install a different set of packages than another router model with another version of the operating system. Over time, the size of the updates may increase due to new packages being added to the software bundle. Since, in this example, all the packages for the update are included in the software bundle, the process of downloading the software bundle to the router may take a significant amount of time and/or resources.

The instant disclosure, therefore, identifies and addresses a need for systems and methods for efficiently updating operating systems installed on network devices.

SUMMARY

As will be described in greater detail below, the instant disclosure generally relates to systems and methods for efficiently updating operating systems installed on network devices. In one example, a computer-implemented method for efficiently updating operating systems installed on network devices may include (1) obtaining an update initiation file that facilitates updating an operating system installed on a network device by way of one or more packages that (A) are external to the update initiation file and (B) have yet to be downloaded to the network device, (2) identifying certain device-specific details about the network device that influence which packages are necessary to achieve the update of the operating system installed on the network device, (3) determining, based at least in part on the update initiation file and the certain device-specific details about the network device, the packages that are necessary to achieve the update of the operating system, (4) downloading the packages that are necessary to achieve the update of the operating system by way of one or more links included in the update initiation file, and then (5) updating the operating system by installing the necessary packages downloaded by way of the links included in the update initiation file.

As another example, a system for implementing the above-described method may include various modules stored in memory. The system may also include at least one physical processor that executes these modules. For example, the system may include (1) an obtaining module that obtains an update initiation file that facilitates updating an operating system installed on a network device by way of one or more packages that (A) are external to the update initiation file and (B) have yet to be downloaded to the network device, (2) an identification module that identifies certain device-specific details about the network device that influence which packages are necessary to achieve the update of the operating system installed on the network device, (3) a determination module that determines, based at least in part on the update initiation file and the certain device-specific details about the network device, the packages that are necessary to achieve the update of the operating system, (4) a download module that downloads the packages that are necessary to achieve the update of the operating system by way of one or more links included in the update initiation file, and (5) an update module that updates the operating system by installing the necessary packages downloaded by way of the links included in the update initiation file.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) obtain an update initiation file that facilitates updating an operating system installed on a network device by way of one or more packages that (A) are external to the update initiation file and (B) have yet to be downloaded to the network device, (2) identify certain device-specific details about the network device that influence which packages are necessary to achieve the update of the operating system installed on the network device, (3) determine, based at least in part on the update initiation file and the certain device-specific details about the network device, the packages that are necessary to achieve the update of the operating system, (4) download the packages that are necessary to achieve the update of the operating system by way of one or more links included in the update initiation file, and then (5) update the operating system by installing the necessary packages downloaded by way of the links included in the update initiation file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary update initiation file that includes Uniform Resource Locators (URLs) to packages that are relevant to and/or necessary for specific combinations of hardware platforms and software architectures.

FIG. 5 is an illustration of an exemplary resource that includes several packages that are relevant to and/or necessary for a specific router model with a certain software configuration.

Figure 1:
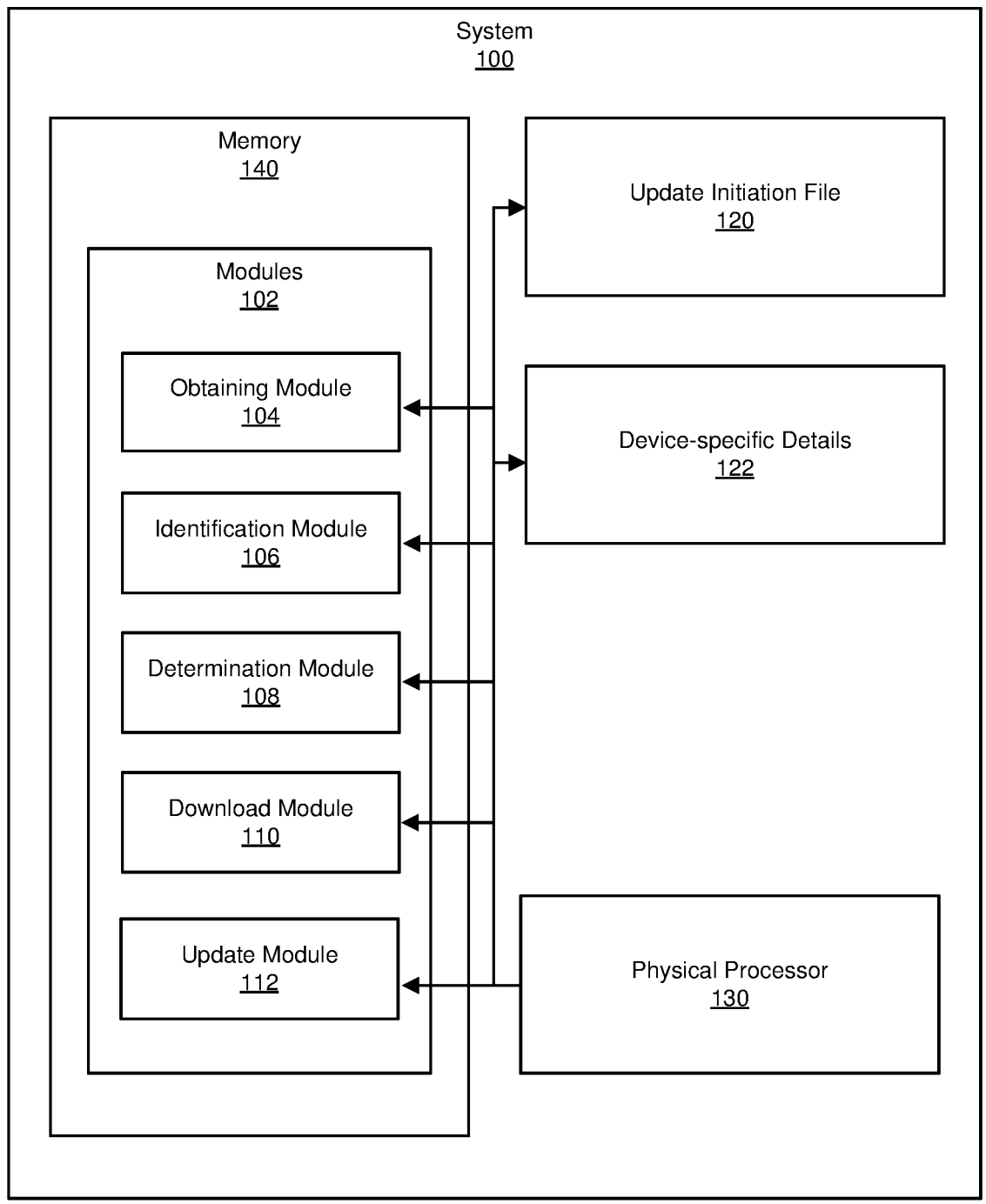
FIG. 1 is a block diagram of an exemplary system for efficiently updating operating systems installed on network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for efficiently updating operating systems installed on network devices. As will be explained in greater detail below, a router may obtain an update initiation file that facilitates updating the router's operating system. This update initiation file may describe and/or point to various packages that are relevant to and/or necessary for certain combinations of hardware platforms and software architectures. Upon obtaining this update initiation file, the router may compare its details (e.g., make, model, operating system version, etc.) to the update initiation file to determine which packages are relevant to and/or necessary for that particular router to achieve the desired update.

The router may then download and install only the packages that are necessary to achieve the update of the operating system on that particular router. Accordingly, the router may refuse to download any packages that are pointed to by the update initiation file but are not necessary to achieve the update of the operating system on that particular router. By doing so, the router may avoid the need to download a traditional software bundle that includes all the packages associated with an update regardless of whether or not those packages are relevant to that particular router. As a result, the router may effectively reduce the amount of time and/or resources that are needed to achieve the desired update.

Figure 2:
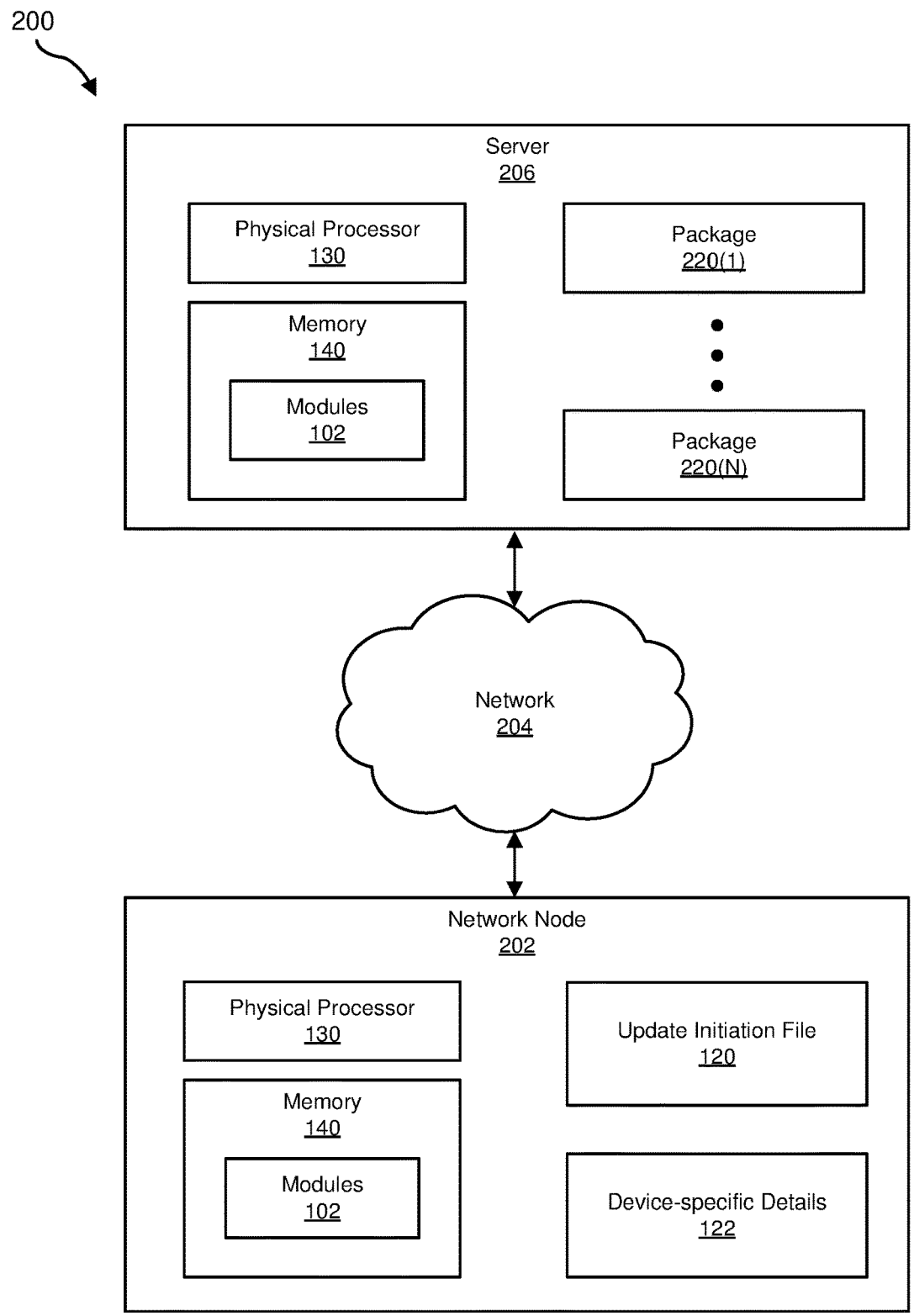
FIG. 2 is a block diagram of an additional exemplary system for efficiently updating operating systems installed on network devices.

The following will provide, with reference to FIGS. 1 and 2, detailed descriptions of exemplary systems for efficiently updating operating systems installed on network devices. Detailed descriptions of corresponding computer-implemented methods will be provided in connection with FIG. 3. Detailed descriptions of an exemplary update initiation file and an exemplary resource will be provided in connection with FIGS. 4 and 5, respectively. In addition, detailed descriptions of an exemplary computing system will be provided in connection with FIG. 6.

FIG. 1 is a block diagram of an exemplary system 100 for efficiently updating operating systems installed on network devices. As illustrated in this figure, exemplary system 100 may include one or more modules 102 for performing one or more tasks. As will be explained in greater detail below, modules 102 may include an obtaining module 104, an identification module 106, a determination module 108, a download module 110, and an update module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or server 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficiently updating operating systems installed on network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more update initiation files, such as update initiation file 120. Update initiation file 120 generally represents any type or form of computer file that facilitates the initiation of an update on an operating system installed on a network device. Update initiation file 120 may differ from traditional software bundles that facilitate updates to operating systems installed on network devices. For example, while some traditional software bundles include all the packages that could possibly be installed during an update, update initiation file 120 may describe, reference, and/or point to packages that are external to update initiation file 120 and have yet to be downloaded to the corresponding network device.

In some examples, update initiation file 120 may include metadata about certain packages that enable network devices of differing hardware platforms (e.g., router models) and/or differing software architectures (e.g., operating system versions). In other words, the metadata included in update initiation file 120 may indicate and/or be used to determine which packages need to be installed to achieve a desired update on a particular hardware platform with a particular software architecture. Additionally or alternatively, update initiation file 120 may include one or more links or URLs that reference, point to, and/or lead to the packages that need to be installed to achieve a desired update on a particular hardware platform with a particular software architecture.

As illustrated in FIG. 1, exemplary system 100 may also include information that identifies certain device-specific details, such as device-specific details 122. Device-specific details 122 generally represent any type or form of information, data, and/or specifics that describe and/or characterize a network device's hardware and/or software configuration. Device-specific details 122 may correspond to and/or represent a certain network device. In other words, one network device may have device-specific details that differ from another network device with respect to their disparate hardware and software combinations. Examples of device-specific details 122 include, without limitation, hardware platforms (such as router models), software architectures (such as operating system versions), previously installed software packages, combinations of one or more of the same, and/or any other suitable device-specific details.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with a server 206 via a network 204. In one example, all or a portion of the functionality of modules 102 may be performed by network device 202, server 206, and/or any other suitable computing system. As will be described in greater detail below, one or more of modules 102 from FIG. 1 may, when executed by at least one processor of network device 202 and/or server 206, enable network device 202 and/or server 206 to efficiently update the operating system installed on network device 202.

Network device 202 generally represents any type or form of computing device capable of reading computer-executable instructions. In one example, network device 202 may include and/or represent a router (such as a provider edge router, a hub router, a spoke router, an autonomous system boundary router, and/or an area border router). Additional examples of network device 202 include, without limitation, switches, hubs, modems, bridges, repeaters, gateways, multiplexers, network adapters, network interfaces, network racks, chasses, servers, portions of one or more of the same, combinations or variations of one or more of the same, and/or any other suitable network device.

Server 206 generally represents any type or form of computing device capable of maintaining, providing, and/or distributing packages that enable network devices to update their operating systems. In one example, server 206 may include and/or represent a web server that distributes, on an as-needed basis, packages to network devices undergoing operating system updates. Additional examples of server 206 include, without limitation, security servers, application servers, storage servers, and/or database servers configured to run certain software applications and/or provide various security, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between network device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Packages 220(1)-(N) each generally represent any type or form of software capable of performing and/or contributing to operating system updates on network devices. In one example, some of packages 220(1)-(N) may enable network device 202 to update its operating system. However, some of packages 220(1)-(N) may be irrelevant to and/or unnecessary for network device 202 to achieve the desired update. Packages 220(1)-(N) may each represent at least a portion of a patch and/or update that, when installed on a network device, brings the network device's operating system to a desired or improved condition and/or configuration.

Figure 3:
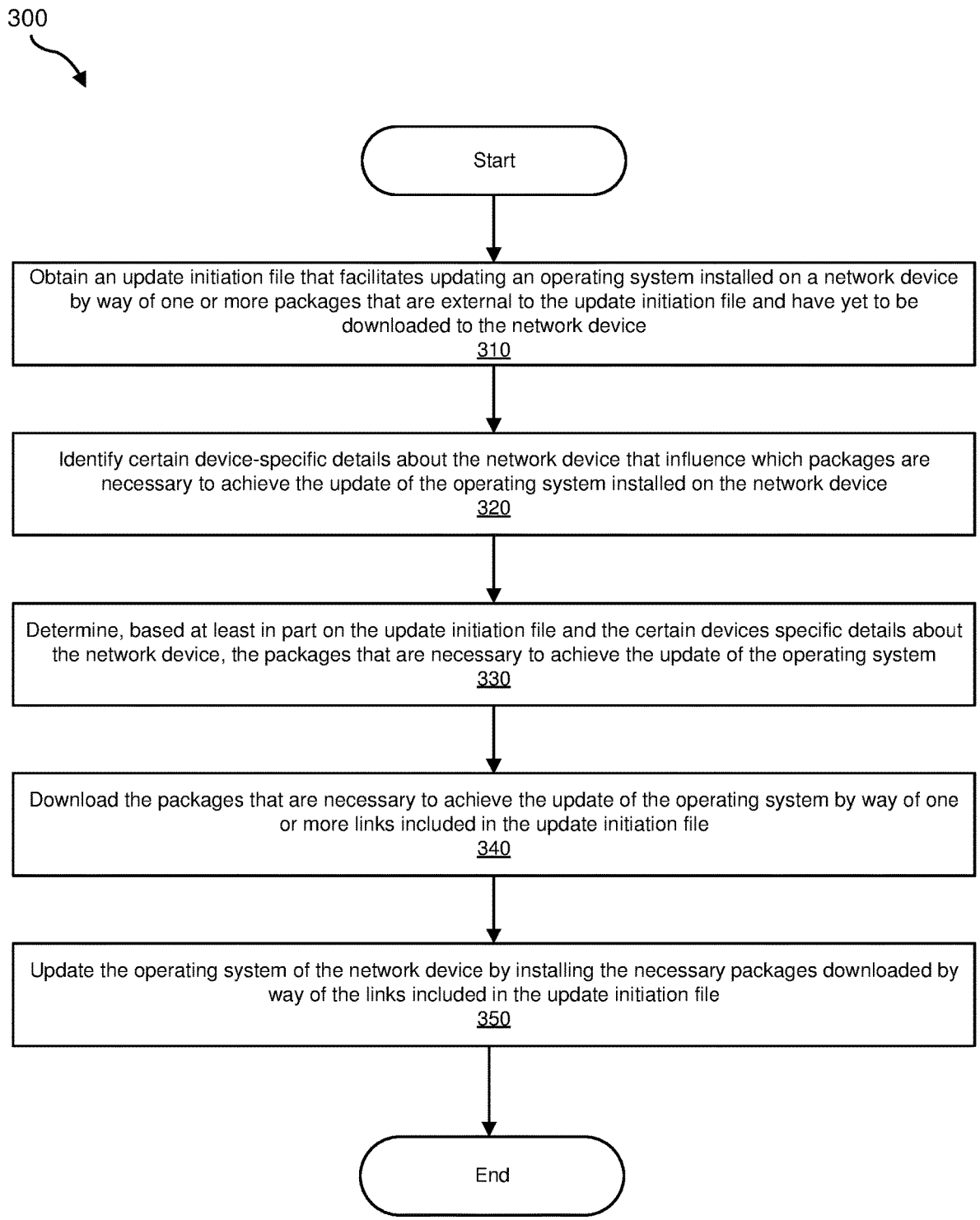
FIG. 3 is a flow diagram of an exemplary method for efficiently updating operating systems installed on network devices.

FIG. 3 is a flow diagram of an example computer-implemented method 300 for efficiently updating operating systems installed on network devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may obtain an update initiation file that facilitates updating an operating system installed on a network device by way of one or more packages that are external to the update initiation file and have yet to be downloaded to the network device. For example, obtaining module 104 may, as part of network device 202 in FIG. 2, obtain update initiation file 120 that facilitates updating an operating system installed on network device 202. In this example, update initiation file 120 may include and/or represent a description of various packages that enable network device 202 to achieve the desired update and are available for download from server 206. In addition, update initiation file 120 may include and/or represent one or more links or URLs to the packages that effectively constitute the update.

The systems described herein may perform step 310 in a variety of different ways and/or contexts. In some examples, obtaining module 104 may receive update initiation file 120 from server 206 or another computing system (not necessarily illustrated in FIG. 2). For example, once an update is ready for distribution, server 206 or the other computing system may send update initiation file 120 to network device 202. In doing so, server 206 or the other computing system may notify network device 202 of the update and/or prepare network device 202 to apply the update.

Additionally or alternatively, obtaining module 104 may query server 206 or another computing system as to whether network device 202 needs to apply any updates to its operating system. In the event that an outstanding update exists, server 206 or the other computing system may respond by sending update initiation file 120 to network device 202. In doing so, server 206 or the other computing system may prepare network device 202 to apply the update.

As illustrated in FIG. 3, at step 320 one or more of the systems described herein may identify certain device-specific details about the network device that influence which packages are necessary to achieve the update of the operating system installed on the network device. For example, identification module 106 may, as part of network device 202 in FIG. 2, identify device-specific details 122 about network device 202. In this example, device-specific details 122 may influence, control, dictate, and/or be used to determine which packages are necessary to achieve the desired update of the operating system installed on network device 202. Examples of device-specific details 122 include, without limitation, a hardware platform of network device 202, the make or model of network device 202, a software architecture of network device 202, the current state of the operating system installed on network device 202, the current version of the operating system installed on network device 202, packages that have already been applied to the operating system installed on network device 202, combinations or variations of one or more of the same, and/or any other suitable device-specific details.

The systems described herein may perform step 320 in a variety of different ways and/or contexts. In some examples, identification module 106 may search network device 202 for any device-specific details that identify the hardware and/or software of network device 202. For example, identification module 106 may search for information that identifies the make and/or model of network device 202. Additionally or alternatively, identification module 106 may search for information that identifies the current version of the operating system running on network device 202.

During this search, network device 202 may identify device-specific details 122. In one example, device-specific details 122 identified on network device 202 may be used to determine the specific packages to apply to network device 202 to achieve the desired update. Similarly, device-specific details about another network device (not necessarily illustrated in FIG. 2) may be used to determine the specific packages to apply to the other network device to achieve the desired update. In the event that these sets of device-specific details differ from one another, the packages to be applied to network device 202 may differ from those to be applied to the other network device.

As illustrated in FIG. 3, at step 330 one or more of the systems described herein may determine the packages that are necessary to achieve the update of the operating system based at least in part on the update initiation file and the certain device-specific details about the network device. For example, determination module 108 may determine that a certain subset of packages 220(1)-(N) are necessary to update the operating system installed on network device 202. In this example, determination module 108 may arrive at this determination based at least in part on update initiation file 120 and device-specific details 122 about network device 202.

The systems described herein may perform step 330 in a variety of different ways and/or contexts. In some examples, determination module 108 may compare device-specific details 122 about network device 202 to update initiation file 120. In one example, identification module 106 may search the metadata included in update initiation file 120 for certain criteria that matches and/or corresponds to device-specific details 122. During this search, identification module 106 may identify the matching criteria within the metadata included in update initiation file 120.

In some examples, the matching criteria within the metadata may correspond to and/or be associated with certain packages that are external to update initiation file 120 and have yet to be downloaded to network device 202. In one example, the matching criteria may correspond to and/or be associated with one or more links or URLs that reference, point to, and/or lead to those packages, which are currently stored on server 206. Additionally or alternatively, the metadata included in update initiation file 120 may indicate which packages are accessible via those links or URLs.

In one example, determination module 108 may determine the packages that are necessary to achieve the update of the operating system based at least in part on those links or URLs. Additionally or alternatively, determination module 108 may determine the packages that are necessary to achieve the update of the operating system based at least in part on the metadata that indicates the packages that correspond to and/or are associated with the matching criteria.

As a specific example, identification module 106 may search update initiation file 120 in FIG. 4 for a combination of hardware and software that matches and/or corresponds to device-specific details 122. As illustrated in FIG. 4, update initiation file 120 may include URLs to packages that facilitate updates for specific combinations of hardware platforms and software architectures. For example, update initiation file 120 in FIG. 4 may include URLs for various software architectures installed on MX5 routers. In particular, update initiation file 120 in FIG. 4 may include URLs to packages for MX5 routers running operating system version OS 9.1R1.1 (in this example, "http://os-update.com/mx5_91r11"), operating system version OS 9.1R1.2 (in this example, "http://os-update.com/mx5_91r12"), operating system version OS 9.1R2.1 (in this example, "http://os-update.com/mx5_91r21"), operating system version OS 9.1R2.2 (in this example, "http://os-update.com/mx5_91r22"), operating system version OS 9.2R1.1 (in this example, "http://os-update.com/mx5_92r11"), and operating system version OS 9.2R1.2 (in this example, "http://os-update.com/mx5_92r12").

In addition, update initiation file 120 in FIG. 4 may include URLs for various software architectures installed on ACX500 routers. In particular, update initiation file 120 in FIG. 4 may include URLs to packages for ACX500 routers running operating system version OS 9.1R1.1 (in this example, "http://os-update.com/acx500_91r11"), operating system version OS 9.1R1.2 (in this example, "http://os-update.com/acx500_91r12"), operating system version OS 9.1R2.1 (in this example, "http://os-update.com/acx500_91r21"), operating system version OS 9.1R2.2 (in this example, "http://os-update.com/acx500_91r22"), operating system version OS 9.2R1.1 (in this example, "http://os-update.com/acx500_92r11"), and operating system version OS 9.2R1.2 (in this example, "http://os-update.com/acx500_92r12"). Update initiation file 120 may also include various other URLs for different software architectures installed on different hardware platforms (although not necessarily illustrated in FIG. 4).

In the event that network device 202 represents an ACX500 router running operating system version OS 9.1R2.1, identification module 106 may search update initiation file 120 in FIG. 4 for any URLs that corresponds to that specific combination of hardware and software. During this search, identification module 106 may identify http://os-update.com/acx500_91r21 as a URL that corresponds to ACX routers running operating system version OS 9.1R2.1. Accordingly, determination module 108 may determine that any packages accessible and/or downloadable via that URL are necessary to achieve the desired update on network device 202.

As a specific example, the http://os-update.com/acx500_91r21 URL may reference, point to, and/or lead to resource 500 in FIG. 5. In this example, resource 500 may be stored and/or located on server 206 (although not necessarily illustrated in FIG. 2). As illustrated in FIG. 5, resource 500 may include packages 220(3), 220(6), 220(7), 220(12), 220(13), 220(30), and 220(32). Additionally or alternatively, resource 500 may enable network device 202 to access and/or download packages 220(3), 220(6), 220(7), 220(12), 220(13), 220(30), and 220(32) via the http://os-update.com/acx500_91r21 URL. In this example, determination module 108 may determine that those packages are necessary to achieve the desired update as network device 202 accesses and/or downloads those packages from server 206.

In one example, the metadata included in update initiation file 120 may identify all the packages that are needed to achieve the desired update. In this example, device-specific details 122 may identify which packages have already been applied to the operating system installed on network device 202. Determination module 108 may compare the packages that have already been applied to the operating system with all the packages that are needed to achieve the desired update. Determination module 108 may then create a delta that identifies which packages are necessary to achieve the update of the operating system. This delta may represent a differential between the packages that have already been applied to the operating system and all the packages that are needed to achieve the desired update.

In some examples, determination module 108 may determine that certain packages referenced by links or URLs included in update initiation file 120 are not necessary to achieve the update of the operating system installed on network device 202. For example, determination module 108 may determine that all packages that have already been applied to the operating system installed on network device 202 are do not need to be downloaded to achieve the desired update due to their earlier installation. Additionally or alternatively, determination module 108 may determine that any packages that do not correspond to and/or are not associated with the hardware platform and software architecture of network device 202 are not necessary to achieve the desired update.

As illustrated in FIG. 3, at step 340 one or more of the systems described herein may download the packages that are necessary to achieve the update of the operating system by way of one or more links included in the update initiation file. For example, download module 110 may download the packages that are necessary to achieve the update of the operating system by way of any relevant links included in update initiation file 120. In this example, such links may include and/or represent URLs that reference, point to, and/or lead to the necessary packages stored and/or maintained on server 206.

The systems described herein may perform step 340 in a variety of different ways and/or contexts. In some examples, download module 110 may initiate the download of the necessary packages by resolving any relevant URLs included in update initiation file 120. For example, identification module 106 may identify the http://os-update.com/acx500_91r21 URL within update initiation file 120 in FIG. 4 as corresponding to the hardware and software of network device 202. Download module 110 may then resolve the http://os-update.com/acx500_91r21 URL, thereby initiating a download of packages 220(3), 220(6), 220(7), 220(12), 220(13), 220(30), and 220(32) to network device 202.

In some examples, download module 110 may refuse to download the packages that are referenced by links or URLs included in update initiation file 120 but are not necessary to achieve the update of the operating system installed on network device 202. For example, server 206 may store and/or maintain various other packages in addition to packages 220(3), 220(6), 220(7), 220(12), 220(13), 220(30), and 220(32). However, since only packages 220(3), 220(6), 220(7), 220(12), 220(13), 220(30), and 220(32) are necessary to achieve the desired update on network device 202, download module 110 may refuse to download any of those other packages. By doing so, download module 110 may enable network device 202 to effectively reduce the amount of time and/or resources that are needed to achieve the desired update.

As illustrated in FIG. 3, at step 350 one or more of the systems described herein may update the operating system of the network device by installing the necessary packages downloaded by way of the links included in the update initiation file. For example, update module 112 may update the operating system of network device 202 by installing the necessary packages downloaded by way of the links included in update initiation file 120. By doing so, update module 112 may bring the operating system installed on network device 202 to a desired or improved condition and/or configuration. Accordingly, update module 112 may achieve the update of the operating system without downloading or installing the packages that are referenced by update initiation file 120 but are not necessary to achieve the update of the operating system.

The systems described herein may perform step 350 in a variety of different ways and/or contexts. In some examples, update module 112 may apply the packages downloaded from server 206 to the operating system installed on network device 202. In one example, update module 112 may complete the update without rebooting network device 202. For example, the metadata included in update initiation file 120 may indicate whether certain packages require a reboot prior to successful operation and/or completion of the update. In this example, determination module 108 may determine that network device 202 does not require a reboot to complete the update of the operating system based at least in part on the metadata included in update initiation file 120. In response to this determination, update module 112 may refuse to reboot network device 202 and thus achieve the update without rebooting network device 202.

In some examples, a computing device (not necessarily illustrated in FIG. 2) within a customer network or at a customer site may download and/or unpack a software bundle that includes the various packages that are referenced by update initiation file 120. This computing device may then act as a distribution host for any network devices within the customer network or at the customer site that need to update their operating systems. For example, instead of leading to server 206, the http://os-update.com/acx500_91r21 URL within update initiation file 120 may alternatively reference, point to, and/or lead to a computing device that has previously downloaded and unpacked a software bundle that includes packages 220(3), 220(6), 220(7), 220(12), 220(13), 220(30), and 220(32). This computing device may be included in and/or represent part of the same customer network and/or site as network device 202.

In this example, by resolving the http://os-update.com/acx500_91r21 URL, download module 110 may effectively initiate a download of packages 220(3), 220(6), 220(7), 220(12), 220(13), 220(30), and 220(32) from that computing device to network device 202. Update module 112 may then update the operating system by installing and/or applying those packages to network device 202.

Figure 6:
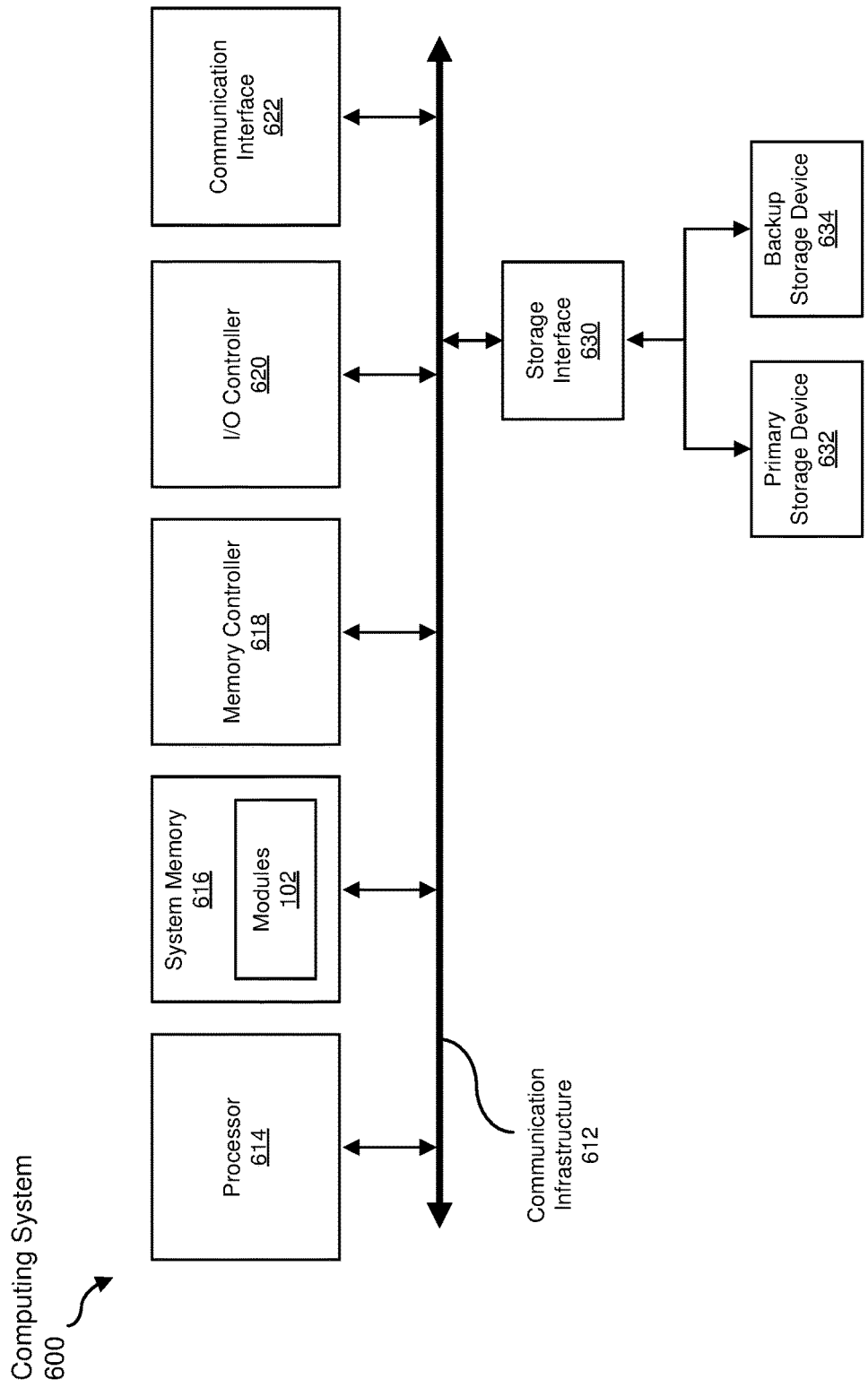
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include and/or store all or a portion of modules 102 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/ or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
obtaining, on a network device, an update initiation file that:
facilitates updating an operating system by way of packages that:
are external to the update initiation file;
are stored on a server; and
are not yet downloaded to the network device;
includes metadata corresponding to the packages;
includes one or more links that reference the packages and are specific to combinations of hardware platforms and software architectures;
identifying certain device-specific details about the network device, wherein the certain device-specific details identify:
a hardware platform of the network device; and
a software architecture of the network device;
identifying, within the update initiation file, the metadata corresponding to the packages;
searching, based at least in part on the metadata, the links included in the update initiation file for a link that is specific to a combination of the hardware platform of the network device and the software architecture of the network device;
identifying, within the links included in the update initiation file based at least in part on the metadata, the link that is specific to the combination of the hardware platform of the network device and the software architecture of the network device;
downloading a subset of the packages stored on the server by way of the link that is specific to the combination of the hardware platform of the network device and the software architecture of the network device, wherein the subset of packages are necessary for the network device to achieve an update of the operating system;
identifying, within the links included in the update initiation file, one or more other links that are specific to one or more other combinations of hardware platforms and software architectures that differ from the combination of the hardware platform of the network device and the software architecture of the network device, wherein at least one of the packages referenced by the other links specific to the other combinations of hardware platforms and software architectures is not necessary for the network device to achieve the update of the operating system;
refusing to download any of the packages stored on the server by way of the other links specific to the other combinations of hardware platforms and software architectures; and
updating the operating system by installing the subset of packages downloaded by way of the link specific to the combination of the hardware platform of the network device and the software architecture of the network device.

2. The method of claim 1, wherein the packages enable network devices of differing hardware platforms and software architectures to achieve a specific update irrespective of a current state of the operating system installed on the network devices.

3. The method of claim 1, wherein the certain device-specific details about the network device further comprise at least one of:
a current state of the operating system installed on the network device; and
a current version of the operating system installed on the network device.

4. The method of claim 1, wherein searching the links included in the update initiation file for the link specific to the combination comprises:
comparing the certain device-specific details about the network device to the update initiation file; and
creating, based at least in part on the comparison, a delta that identifies the subset of packages.

5. The method of claim 1, wherein updating the operating system comprises achieving the update of the operating system without downloading or installing the at least one of the packages referenced by the other links specific to the other combinations of hardware platforms and software architectures.

6. The method of claim 1, wherein the links included in the update initiation file comprise a Uniform Resource Locator (URL) that references the subset of packages that are necessary for the network device to achieve the update of the operating system.

7. The method of claim 6, wherein downloading the subset of packages comprises:
identifying the URL that references the subset of packages; and
resolving the URL to download the subset of packages to the network device.

8. The method of claim 1, wherein the metadata indicating whether at least one package referenced by the update initiation file requires a reboot prior to operation.

9. The method of claim 8, wherein updating the operating system comprises:
determining, based at least in part on the metadata, that the network device does not require a reboot to complete the update of the operating system; and
in response to determining that the network device does not require a reboot to complete the update of the operating system, achieving the update without rebooting the network device.

10. A system comprising:
an obtaining module, stored in memory on a network device, that obtains an update initiation file that:
facilitates updating an operating system by way of packages that:
are external to the update initiation file;
are stored on a server; and
are not yet downloaded to the network device;
includes metadata corresponding to the packages; and
includes one or more links that reference the packages and are specific to combinations of hardware platforms and software architectures;
an identification module, stored in the memory, that:
identifies certain device-specific details about the network device, wherein the certain device-specific details identify:
a hardware platform of the network device; and
a software architecture of the network device;
identifies, within the update initiation file, the metadata corresponding to the packages;
searches, based at least in part on the metadata, the links included in the update initiation file for a link that is specific to a combination of the hardware platform of the network device and the software architecture of the network device;
identifies, within the links included in the update initiation file based at least in part on the metadata, the link that is specific to the combination of the hardware platform of the network device and the software architecture of the network device; and
identifies, within the links included in the update initiation file, one or more other links that are specific to one or more other combinations of hardware platforms and software architectures that differ from the combination of the hardware platform of the network device and the software architecture of the network device;
a download module, stored in the memory, that:
downloads a subset of the packages stored on the server by way of the link that is specific to the combination of the hardware platform of the network device and the software architecture of the network device, wherein the subset of packages are necessary for the network device to achieve an update of the operating system;
refuses to download any of the packages stored on the server by way of the other links specific to the other combinations of hardware platforms and software architectures, wherein at least one of the packages referenced by the other links specific to the other combinations of hardware platforms and software architectures is not necessary for the network device to achieve the update of the operating system;
an update module, stored in the memory, that updates the operating system by installing the subset of packages downloaded by way of the link specific to the combination of the hardware platform of the network device and the software architecture of the network device; and
at least one physical processor that executes the obtaining module, the identification module, the download module, and the update module.

11. The system of claim 10, wherein the packages enable network devices of differing hardware platforms and software architectures to achieve a specific update irrespective of a current state of the operating system installed on the network devices.

12. The system of claim 10, wherein the certain device-specific details about the network device further comprise at least one of:
a current state of the operating system installed on the network device; and
a current version of the operating system installed on the network device.

13. The system of claim 10, wherein the identification module compares the certain device-specific details about the network device to the update initiation file; and
further comprising a determination module, stored in the memory, that creates, based at least in part on the comparison, a delta that identifies the subset of packages.

14. The system of claim 10, wherein the update module achieves the update of the operating system without downloading or installing the at least one of the packages referenced by the other links specific to the other combinations of hardware platforms and software architectures.

15. The system of claim 10, wherein the links included in the update initiation file comprise a Uniform Resource Locator (URL) that references the subset of packages that are necessary for the network device to achieve the update of the operating system.

16. A non-transitory computer-readable medium comprising one or more computer-executable instructions that, when executed by at least one processor of a network device, cause the network device to:
obtain an update initiation file that:
facilitates updating an operating system by way of packages that:
are external to the update initiation file;
are stored on a server; and
are not yet downloaded to the network device;
includes metadata corresponding to the packages; and
includes one or more links that reference the packages and are specific to combinations of hardware platforms and software architectures;
identify certain device-specific details about the network device, wherein the certain device-specific details identify:
a hardware platform of the network device; and
a software architecture of the network device;
identify, within the update initiation file, the metadata corresponding to the packages;
search, based at least in part on the metadata, the links included in the update initiation file for a link that is specific to a combination of the hardware platform of the network device and the software architecture of the network device;
identify, within the links included in the update initiation file based at least in part on the metadata, the link that is specific to the combination of the hardware platform of the network device and the software architecture of the network device;
download a subset of the packages stored on the server by way of the link that is specific to the combination of the hardware platform of the network device and the software architecture of the network device, wherein the subset of packages are necessary for the network device to achieve an update of the operating system;
identify, within the links included in the update initiation file, one or more other links that are specific to one or more other combinations of hardware platforms and software architectures that differ from the combination of the hardware platform of the network device and the software architecture of the network device, wherein at least one of the packages referenced by the other links specific to the other combinations of hardware platforms and software architectures is not necessary for the network device to achieve the update of the operating system;
refuse to download any of the packages stored on the server by way of the other links specific to the other combinations of hardware platforms and software architectures; and
update the operating system by installing the subset of packages downloaded by way of the link specific to the combination of the hardware platform of the network device and the software architecture of the network device.

* * * * *